H. SKREBERG.
WAGON BOX LINING.
APPLICATION FILED JAN. 26, 1914.
1,151,972.
Patented Aug. 31, 1915.
2 SHEETS—SHEET 2.
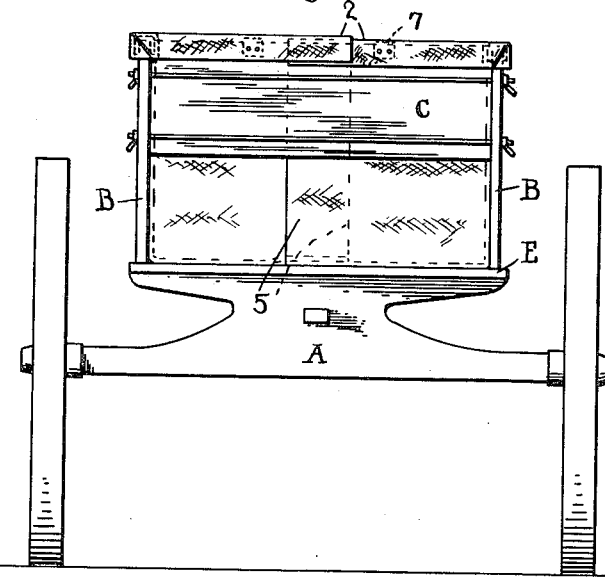
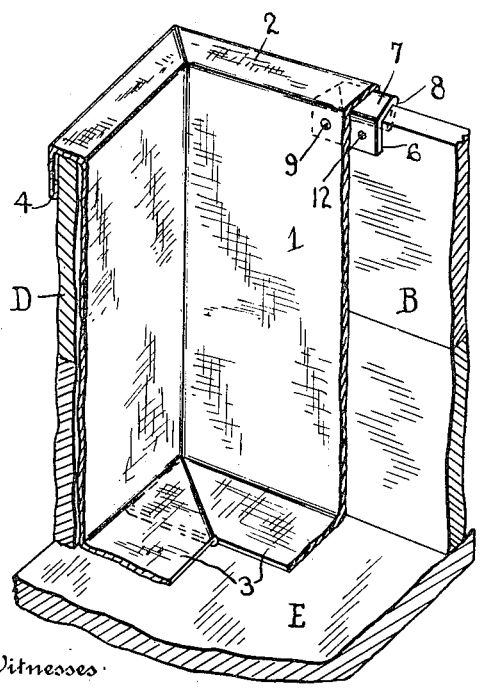
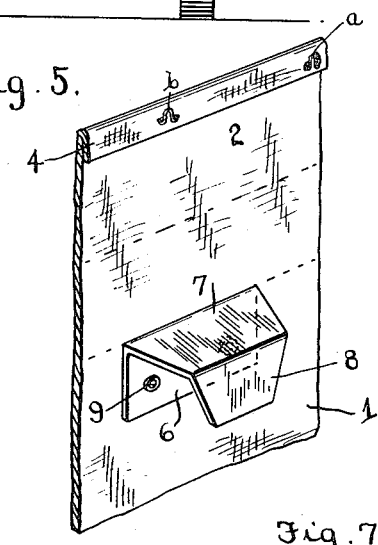
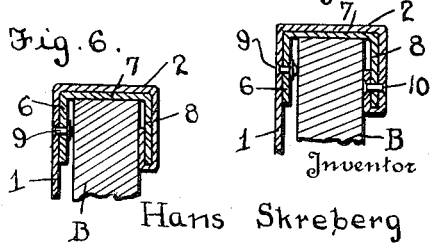
Witnesses
L. B. James
May Barnes
Inventor
Hans Skreberg
By Geo. W. Sues
Attorney

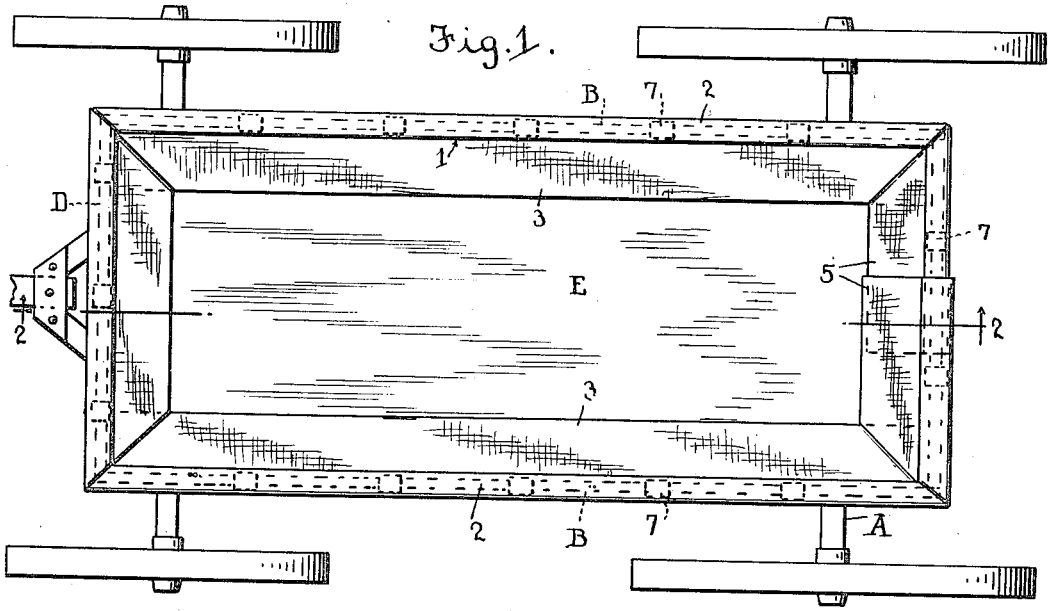
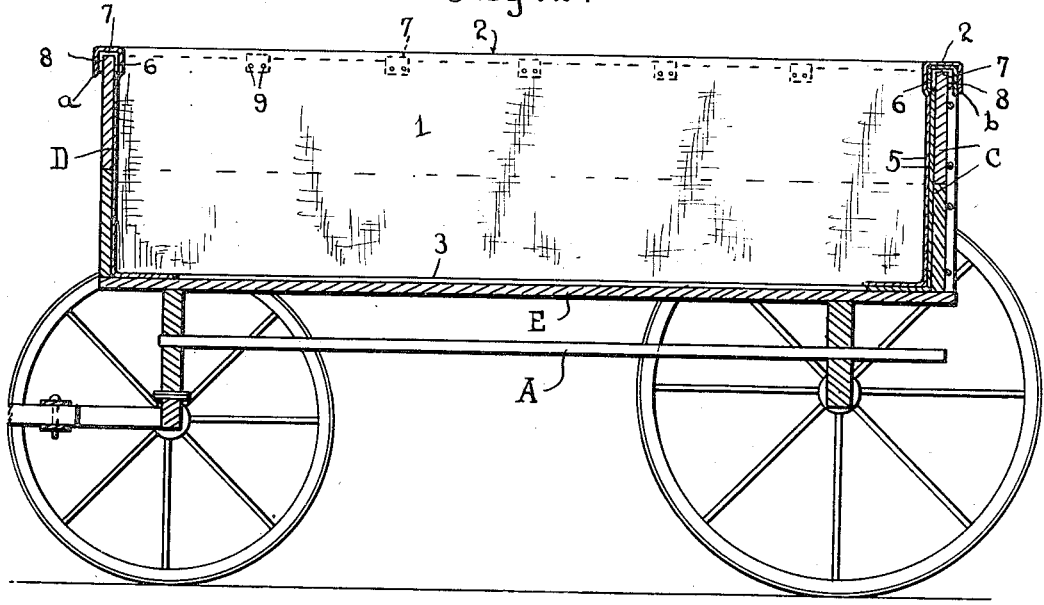

UNITED STATES PATENT OFFICE.

HANS SKREBERG, OF BIG BEND TOWNSHIP, CHIPPEWA COUNTY, MINNESOTA.

WAGON-BOX LINING.

1,151,972. Specification of Letters Patent. Patented Aug. 31, 1915.

Application filed January 26, 1914. Serial No. 814,561.

*To all whom it may concern:*

Be it known that I, HANS SKREBERG, a citizen of the United States, and a resident of Big Bend township, in the county of Chippewa and State of Minnesota, have invented certain new and useful Improvements in Wagon-Box Linings, of which the following is a specification, reference being had to the accompanying drawings, forming a part of this specification.

This invention relates to a fabric lining arranged to be used in connection with a farm wagon to provide the same with a grain-tight box, the construction being such that the lining may be connected at its inner upper edge to convert the same into a wagon cover, which can be compactly folded or rolled while not in use.

One object of the invention is to provide an ordinary farm wagon with a fabric lining which can be placed in position or removed, with ease, accuracy and despatch.

Another object is to provide a wagon box lining arranged so that the grain may be expeditiously removed from the wagon box.

With these and other objects in view, the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1 shows a top view of an ordinary farm wagon provided with a lining constructed according to my invention. Fig. 2 is a section on line 2, 2, of Fig. 1. Fig. 3 shows a rear view of a wagon provided with my wagon box lining showing the lower part of the tail board as removed, so that the rear ends of the lining may be parted permitting the ready removal of the grain. Fig. 4 shows a detached sectional detail of a wagon box corner provided with a removable lining embodying my invention. Fig. 5 shows a fragmentary portion of an upper inner edge of the lining showing one of the retaining members, and a hook and eye. Figs. 6 and 7 show modifications in which the ends of the lining are secured to the outer edges of the retaining members.

In the hauling of small grain in farm wagons, there is a considerable loss of grain, owing to the fact that as a rule the ordinarily constructed farm wagons have no springs, so that in driving over rough roads, the sides are jarred away from the bottom, so that the grain not only wedges into the space between the bottom and the sides and ends, but in many cases leaks through the openings, causing a loss of grain.

In my present invention I provide a fabric lining which is arranged to cover the inner walls of the wagon box and lap over the upper edge and partly cover the wagon box bottom, a suitable holding means being employed to hook over the upper edge of the wagon box to hold the lining in position. The construction being such that when not used as a wagon box lining, the upper ends of the lining may be connected so that the lining may be made to do service as a rain cover or tarpaulin.

When not in use as a lining or cover, the lining may be compactly rolled so that the same can be conveniently stored under the wagon seat.

In the accompanying drawings, the letter A, designates the running gear of an ordinary farm wagon; B, the sides and C and D, the tail gate and front of the wagon.

The fabric lining as used in my invention comprises a main portion 1, having the upper overlapping edge 2 and the lower bottom covering edge 3. As shown in Fig. 5, the upper edge of the lining is overlapped as shown at 4. The lower edge may be similarly overlapped, while the ends 5 of the lining are of such a length that they will overlap as shown in Figs. 1 and 3.

In order to hold the upper edge of the lining to the upper edge of the sides and ends, I employ a plurality of retaining members. As shown in Fig. 5, where one of the retaining members is shown, these are made of sheet metal and comprise the base portion 6, from which extends at right angles the bearing portion 7, ending in the retaining lip 8, which is held at right angles to the bearing portion. This base 6 has suitable openings 12, one being shown in Fig. 4, and passing through these openings 12 are suitable rivets 9, so that these retaining members are securely held to the fabric linings.

The lining 1, may be of water proof material and is provided near the upper inner edge with a plurality of hooks *a*, and eyes *b*. By means of these hooks and eyes, the lining may be connected along its upper inner edges to convert the same into a cover arranged to be pulled over the wagon box to serve as a rain shield. It is of course understood that these lining members are made of a suitable width so that the intermediate portion will cover the inner walls of the wagon box and fold over the upper edge as well as cover part of the bottom of the wagon to provide a lining that will cover all cracks within the side or bottom.

A wagon equipped with my lining loaded with small grain can be easily emptied by simply removing the lower section of the tail gate C, as shown in Fig. 3, and then drawing the overlapping ends 5 apart, these ends being drawn outward and forming a sort of chute out of which the grain will gravitate. Later on the grain can be easily shoveled out of the wagon end.

A wagon box lining constructed according to my invention is simple and inexpensive in construction and both durable and efficient in operation and can be easily placed into position.

Having thus described my said invention what I claim as new and desire to secure by U. S. Letters Patent is:—

1. The combination with a wagon box of a lining comprising a fabric section of a width to cover the inner walls of the wagon box and fold over the upper edge and cover part of the bottom of the wagon the lining being of a length so that its ends will overlap, and a plurality of retaining members secured in spaced relation to said lining each comprising a sheet metal member including a flat apertured securing base from which extends at right angles a bearing portion ending in a retaining lip held at right angles to said bearing portion and rivets within said apertures to hold said retaining members to said fabric lining near its upper edge, as and for the purpose set forth.

2. A wagon box lining comprising a fabric section of a width to cover the inner walls of a wagon box and fold over the upper edge and cover part of the bottom of the wagon, the lining being of a length so that its ends will overlap, a plurality of hooks secured in spaced relation near the upper edge of said lining adapted to hook over the upper edge of a wagon box, and a plurality of hooks and eyes secured at the upper inner edge of said lining, as and for the purpose set forth.

In testimony whereof I affix my signature, in the presence of two witnesses.

HANS SKREBERG.

Witnesses:
J. H. SKOGRAND,
C. P. ERICKSON.

Copies of this patent may be obtained for five cents each, by addressing the "Commissioner of Patents, Washington, D. C."